United States Patent [19]

Hasler et al.

[11] 4,264,412

[45] Apr. 28, 1981

[54] PROCESS OF RECOVERING FIBRES

[75] Inventors: David J. Hasler, Caddington; Peter Sinclair, Gerrards; Eileen H. Burns, Beaconsfield, all of England

[73] Assignee: The Wiggins Teape Group Limited, Hampshire, England

[21] Appl. No.: 41,305

[22] Filed: May 22, 1979

[30] Foreign Application Priority Data

May 22, 1978 [GB] United Kingdom ............... 21245/78

[51] Int. Cl.³ .............................................. D21C 5/02
[52] U.S. Cl. .......................................... 162/4; 162/5; 162/6
[58] Field of Search ................................... 162/4, 5, 6

[56] References Cited

U.S. PATENT DOCUMENTS 3,933,578  1/1976  Kasugai et al. .......................... 162/5

FOREIGN PATENT DOCUMENTS 2642319  12/1977  Fed. Rep. of Germany .............. 162/5
1422489   1/1976  United Kingdom .

*Primary Examiner*—William F. Smith
*Attorney, Agent, or Firm*—Shlesinger, Arkwright, Garvey and Dinsmore

[57] ABSTRACT

Fibre recovery process for pressure-sensitive carbonless copying paper which comprises defibrating the wastage in aqueous media, preferably in the presence of a cationic quaternary ammonium surface active agent, treating the wastage with acid to destroy the microcapsules, and bleaching the defibrated wastage with a bleaching agent.

20 Claims, No Drawings

PROCESS OF RECOVERING FIBRES

This invention relates to a process of recovering fibres from wastage of pressure-sensitive carbonless copying paper.

Pressure-sensitive carbonless copying paper is conventionally used in manifold assemblies where one or more copies are required. The paper can be of the type used in the self-contained systems but more frequently is of the type used in transfer systems. In the latter, the underside of a top sheet (the CB sheet) has a coating of uniformly distributed microcapsules containing a colour former solution, and in which the topside of a bottom sheet (the CF sheet) has a colour developing coating. When localized pressure, through the agency of pencil, pen, stylus, typewriter key or die impression, is applied to the topside of the topsheet, rupture of the microcapsules on the underside occurs releasing the colour former solution. The colour developing coating of the bottom sheet, which is in contiguous relationship with the microcapsule coating of the top sheet, adsorbs and reacts with the colour former engendering a coloured image corresponding in configuration to those areas of the top sheet to which pressure had been applied. In this way, a copy is produced on the bottom sheet of whatever is applied by pressure to the top sheet.

In the usual situation where more than one copy is required, then further sheets are interposed between the top and bottom sheets. Each of the further sheets (CFB sheets) has on its underside a colour former solution containing microcapsule coating and on its topside a colour developing coating. All the sheets are arranged into a manifold assembly by including between the CB and CF sheets as many CFB sheets as are required with every microcapsule coating being in contiguous relationship with a colour developing coating.

The colour former may be a leuco dye derivative, such as crystal violet lactone, a fluoran derivative, a diphenylamine derivative, a spiropyran derivative, or a phthalimidine derivative. All of these are substantially colourless but can produce a colour on reaction with an electron accepting colour developing coating, which may be an acidic clay, a phenolic resin or an aromatic carboxylic acid salt. The colour former is encapsulated as a solution by processes known in the pressure-sensitive carbonless copying paper art, for example by a coacervation process using gelatin with gum arabic or carboxymethyl cellulose, or other materials. Alternatively, encapsulation can be carried out using a process based on synthetic raw materials which include for instance an aminoplast resin, such as urea-formaldehyde or melamine-formaldehyde (see for example British Pat. Nos. 989 264, 1 476 042 and 1 507 739), or based on a polyacrylate.

In the manufacture of pressure-sensitive carbonless copying paper, the sides of sheets of newly-coated paper are normally trimmed. These trimmings together with used or damaged pressure-sensitive copying paper give rise to a considerable amount of wastage, referred to in the industry as broke. Indeed, such is the amount of wastage produced that it could be economically desirable to recover the fibres from the paper so that they may be re-cycled or used in the manufacture of some other type of paper.

U.K. Pat. No. 1 422 489 describes a method of recovering fibres from wastage of pressure-sensitive carbonless copying paper, which involves defibrating the wastage in an alkaline solution in the presence of a surface active agent; preferably the pH of the solution is greater than 7.5. During the operation of this method, colour former is released into the alkali solution by mechanical rupture of microcapsules through the grinding action of the defibrating machine. The effectiveness of such grinding action is however very limited in that only some of the microcapsules become ruptured, as mentioned above. Thus at the end of the defibration stage, there are microcapsules which have been left intact and which will impair the quality of the recovered fibres. Whilst such recovered fibres may be suitable for use in the manufacture of low-quality papers, they are clearly not suitable, in view of their contamination with colour former containing microcapsules, for recycling in the manufacture of pressure-sensitive carbonless copying paper.

Further, the surface active agents, which may be anionic, cationic or non-ionic, serve to block the adsorption sites on the colour developing coating so that, on release of the colour former into the alkaline solution, there is little, if any, colour producing reaction. Nonetheless, the recovered fibres are still stained, if only to a slight extent, and therefore the brightness of any paper manufactured therefrom will be diminished.

It is an object of the present invention to provide a fibre recovery process for wastage of pressure-sensitive carbonless copying paper which relies primarily upon chemical action to rupture the capsules and, in so doing, is more effective than rupture by mechanical action.

It is a further object of the present invention to provide a process for the recovery of substantially non-stained fibres that are eminently suitable for re-use in the manufacture of bright, medium- or high-quality paper.

The present invention provides a process for the recovery of fibres from wastage of pressure-sensitive carbonless copying paper, which comprises defibrating the wastage in aqueous media, treating the wastage with acid to destroy the microcapsules, and bleaching the defibrated wastage with a bleaching agent.

The amount of wastage that can be defibrated at any one time may vary. The use of small amounts however tends to be inefficient whilst the use of large amounts makes defibration more difficult to achieve. A compromise between these extremes is therefore appropriate and, in practice, an amount of about 6% of wastage (based on the weight of water) is preferred.

Defibration may be carried out at room temperature or at elevated temperatures. For simplicity and cost however, room temperature is preferred.

Very bright fibres of use in the manufacture of high quality paper, including pressure-sensitive carbonless copying paper, can be obtained by the process of the present invention if a cationic quaternary ammonium surface active agent is present during defibration of the wastage. Particularly preferred surface active agents are of formula (I),

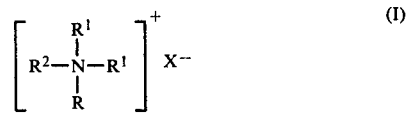

wherein $R^1$ is a $C_1$–$C_4$ alkyl group, $R^2$ is a $C_5$–$C_{18}$ alkyl or alkenyl group, preferably a $C_8$–$C_{18}$ alkyl or alkenyl group, R is $R^1$ or $R^2$, and $X^-$ is an anion.

Each of $R^1$ and $R^2$ preferably has a straight chain-alkyl group. Optimally, $R^1$ is methyl and $R^2$ is octyl, decyl, dodecyl, tetradecyl, hexadecyl or octadecyl. Alternatively, $R^2$ is octadecenyl. The cationic surface active agent may be a single quaternary ammonium compound or preferably a mixture of different quaternary ammonium compounds. Those surface active agents sold under the trade name "Arquad" (obtainable from Armour Hess Chemicals Ltd.) have been found to be eminently suitable, in particular "Arquad" 12-50 ($R=R^1$=methyl, $R^2$=dodecyl, tetradecyl and octadecenyl in proportions of 90:9:1 respectively), "Arquad" 18-50 ($R=R^1$=methyl, $R^2$=hexadecyl, octadecyl and octadecenyl in proportions of 6:93:1 respectively), "Arquad" C-50 ($R=R^1$=methyl, $R^2$=octyl, decyl, dodecyl, tetradecyl, hexadecyl, octadecyl and octadecenyl in proportions of 8:9:47:18:8:5:5 respectively), and "Arquad" 2C-50 ($R^1$=methyl, $R=R^2$=octyl, decyl, dodecyl, tetradecyl, hexadecyl and octadecyl in proportions of 8:9:47:18:8:10 respectively).

The quaternary ammonium group is used as a salt in which the anion, $X^-$, may be any of those normally associated with such a group. Its nature is not of critical importance but halide, in particular chloride, anions have been found quite satisfactory.

The amount of surface active agent required depends on the amount of wastage and the type of agent. In practice, the optimum amount required for a given application may be determined by simple experimentation. As a general guide however, 0.5 to 10% of surface active agent may be used (based on the weight of wastage).

Acids which can be used to destroy the microcapsules include mineral and organic acids, such as sulphuric acid, hydrochloric acid, nitric acid, acetic acid and citric acid. Weaker acids may also be used but they will probably be less effective although this would depend to some extent on the nature and thickness of the capsular walls. The use of a stronger acid is however preferred. Concentrated hydrochloric acid is particulary suited for the destruction of gelatin and aminoplast capsules.

Generally, sufficient acid should be used so as to result in the aqueous media having a pH of less than 3.5, or preferably less than 3.0, or even more preferably less than 2.5. Most preferably, the pH is between 1 and 2. The amount needed to achieve the required pH can be determined without difficulty. A typical range is from 25–50% of concentrated acid (based on the weight of wastage).

The temperature during acidification is not critical although in some cases it may be necessary to use elevated temperatures to aid the destruction of the capsules, particularly if a weak acid is used. Normally though, destruction of the capsules can be achieved at room temperature within a few minutes of adding the acid.

Treatment of the wastage with an acid may be carried out simultaneously with its defibration. However, it is preferred to carry out such treatment subsequently in order to allow for an intermediate rinsing operation should this be required.

Destruction of the capsules in accordance with the present invention releases the colour former solution into the aqueous media. The colour former then preferentially reacts with the acid present to produce a coloured solution which does not substantially fasten to the fibres especially if a cationic quaternary ammonium surface active agent is used during defibration. The colour can therefore be readily bleached out or, if preferred, rinsed first and then bleached out.

Bleaching agents which may be used with the present invention include chlorinated water and hydrogen peroxide. However sodium hypochlorite solution is preferred. A typical amount of sodium hypochlorite solution which may be used is 25% of solution (10–14% (w/v) of available chlorine) (based on the weight of wastage), although this can vary according to the intensity of the whiteness required.

It is generally advisable to commence bleaching soon after the production of the coloured solution referred to above. In this way, any possible absorption of the colour by the fibres is obviated or at least minimised. The bleaching operation should be allowed to proceed until the fibres are as white as desired.

One of the advantages of using sodium hypochlorite solution is that it can be added directly to the defibrated wastage after the production of the coloured solution without any need for adjustment in pH; indeed sodium hypochlorite solution tends to perform better as a bleaching agent at low pH's. Typically bleaching with sodium hypochlorite solution takes about 1 hour under acidic conditions. As usual, once bleaching has finished, or even towards the end of the bleaching operation, the pH may be increased with, for example sodium sulphite or sodium hydroxide, until the pH is approximately 7.

The white fibres obtained at the end of the bleaching operation are frequently of a quality and a whiteness which renders them eminently suitable for recycling or for use in the manufacture of other high quality papers.

Throughout the entire process, rinse operations may be included if so desired, for instance to remove some of the clay or resin before treatment of the wastage with acid. Such rinsing is however not essential.

Further advantages of the present invention will now become apparent from the following description of embodiments of the present invention.

EXAMPLE 1

Water (1 liter) was poured into a paper disintegrator (manufactured by Mavis Engineering Ltd., London) and its pH reduced to a pH of 5.0 using concentrated hydrochloric acid. The surface active agent, "Arquad" C-50 (2.5 ml), was then stirred in and wastage (60 g) added; the wastage consisting of pressure-sensitive carbonless copying paper in which the capsules were made from an aminoplast resin and the colour developing coating was clay. The wastage was then defibrated for 15 minutes. The fibres were rinsed and returned to 6% consistency using clean water. Concentrated hydrochloric acid (20 ml) was then added giving a pH of 1.2, and the defibrated wastage stirred for 1 minute. Sodium hypochlorite solution (10–14% active chlorine, 15 ml) was added and the defibrated wastage stirred for a further minute. After 1 hour, a further rinse was carried out and then the pH was raised to neutral using sodium sulphite, leaving fibres of good quality which were constituted into paper of high brightness.

EXAMPLE 2

Example 1 was repeated except that "Arquad" C-50 was replaced in turn by "Arquad" 12-50, "Arquad"

18-50, and "Arquad" 2C-50. In each instance, fibres of good quality and brightness were recovered.

EXAMPLE 3

Example 1 was repeated except that concentrated hydrochloric acid was replaced in turn by concentrated nitric, sulphuric and glacial acetic acid. In each instance, fibres of good quality and brightness were recovered.

EXAMPLE 4

Example 1 was repeated for wastage of pressure-sensitive copying paper in which the capsules were made from gelatin. Fibres of good quality and brightness were recovered.

EXAMPLE 5

Water (1 liter) was poured into a paper disintegrator (manufactured by Mavis Engineering Ltd., London) and wastage (60 g) was added consisting of pressure-sensitive carbonless copying paper in which the capsules were made from an aminoplast resin and the colour developing coating was clay. The surface active agent, "Arquad" C-50 (2.5 ml), was then stirred in together with concentrated hydrochloric acid (20 ml), the resulting pH being between 1 and 2. The wastage was then defibrated for 15 minutes. Sodium hypochlorite solution (10–14% active chlorine, 15 ml) was added to the resulting defibrated wastage which was stirred for a further hour. A rinse was then carried out and the pH raised to neutral using sodium sulphite, leaving fibres of good quality and brightness.

EXAMPLE 6

Example 1 was repeated without the use of any surface active agent. Fibres of good quality were recovered although they were slightly stained unlike the fibres recovered according to Examples 1 to 5.

What we claim is:

1. A process for the recovery of fibers from wastage of pressure-sensitive carbonless copying paper having color former containing microcapsules, comprising the steps of:
    defibrating the wastage in aqueous media;
    treating the wastage in the aqueous media with acid to destroy the microcapsules, the acid reducing the pH of the aqueous media to less than 3.0; and,
    bleaching the defibrated wastage with a bleaching agent.

2. A process according to claim 1 and including the step of including a cationic quaternary ammonium surface active agent in said aqueous media during said defibrating step.

3. A process according to claim 2 wherein said surface active agent is a compound of formula (1),

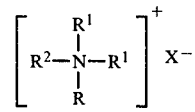

wherein $R^1$ is a $C_1$–$C_4$ alkyl group, $R^2$ is a $C_5$–$C_{18}$ alkyl or alkenyl group, R is $R^1$ or $R^2$, and $X^-$ is an anion.

4. A process according to claim 3, wherein $R^2$ is a $C_8$–$C_{18}$ alkyl or alkenyl group.

5. A process according to either claim 3 or 4, wherein $R^1$ and $R^2$ are straight chain groups.

6. A process according to claim 5, wherein $R^1$ is methyl.

7. A process according to claim 5, wherein $R^2$ is octyl, decyl, dodecyl, tetradecyl, hexadecyl or octadecyl.

8. A process according to claim 5, wherein $R^2$ is octadecenyl.

9. A process according to claim 3, wherein the surface active agent consists of a mixture of compounds of formula (1).

10. A process according to claim 3, wherein the anion is a chloride anion.

11. A process according to claim 2, wherein from 0.5 to 10% of surface active agent is used.

12. A process according to claim 1, wherein the acid is sulphuric acid, hydrochloric acid, nitric acid, acetic acid or citric acid.

13. A process according to claim 1, wherein the acid reduces the pH of the aqueous media to less than 2.5.

14. A process according to claim 1, wherein the acid reduces the pH of the aqueous media to from 1 to 2.

15. A process according to claim 1, wherein said acid treating step is carried out subsequently to said defibrating step.

16. A process according to claim 15, and including the step of rinsing the wastage between said defibrating step and said acid treating step.

17. A process according to claim 1, wherein the bleaching agent is chlorinated water or hydrogen peroxide.

18. A process according to claim 1, wherein the bleaching agent is sodium hypochorite solution.

19. A process according to claim 18, wherein the acid treating step produces a colored solution and the bleaching step comprises adding the sodium hypochlorite solution directly to the defibrated wastage once the colored solution has been produced without adjusting the pH.

20. A process according to claim 1, wherein the pressure-sensitive carbonless copying paper contains gelatin or aminoplast microcapsules and a color developing coating of a clay or resin.

* * * * *